(12) United States Patent
Kageta

(10) Patent No.: US 9,882,319 B2
(45) Date of Patent: *Jan. 30, 2018

(54) REAR CAMERA SYSTEM FOR A VEHICLE WITH A TRAILER

(71) Applicant: Scott Kageta, El Dorado Hills, CA (US)

(72) Inventor: Scott Kageta, El Dorado Hills, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/831,384

(22) Filed: Aug. 20, 2015

(65) Prior Publication Data

US 2015/0357767 A1 Dec. 10, 2015

Related U.S. Application Data

(63) Continuation of application No. 13/554,286, filed on Jul. 20, 2012, now Pat. No. 9,154,746.

(51) Int. Cl.
| | |
|---|---|
| *H04N 7/18* | (2006.01) |
| *H01R 13/66* | (2006.01) |
| *H04N 5/225* | (2006.01) |
| *H01R 43/26* | (2006.01) |
| *B60R 1/00* | (2006.01) |

(52) U.S. Cl.
CPC .......... *H01R 13/6691* (2013.01); *B60R 1/00* (2013.01); *H01R 43/26* (2013.01); *H04N 5/2257* (2013.01); *H04N 7/183* (2013.01); *B60R 2300/70* (2013.01); *B60R 2300/808* (2013.01); *Y10T 29/4921* (2015.01)

(58) Field of Classification Search
CPC ...... H01R 13/6691; H04N 5/57; H04N 5/607; H04N 5/765; H04N 21/4318; H04R 1/1041; H04R 3/00; H04R 5/04
USPC ........................................................ 348/148
See application file for complete search history.

(56) References Cited

U.S. PATENT DOCUMENTS

| | | | |
|---|---|---|---|
| 3,922,641 A | 11/1975 | Gates, Jr. | |
| 6,007,346 A * | 12/1999 | Gutierrez | ................. B60D 1/62 439/35 |
| 6,184,781 B1 | 2/2001 | Ramakesavan | |
| 6,266,084 B1 * | 7/2001 | Sakata | ............... H01B 11/1891 174/32 |
| 6,690,413 B1 | 2/2004 | Moore | |
| 6,933,837 B2 | 8/2005 | Gunderson et al. | |
| 7,195,267 B1 | 3/2007 | Thompson | |
| 7,455,524 B1 | 11/2008 | Fudala et al. | |
| 7,463,281 B2 | 12/2008 | Luskin et al. | |
| 7,561,181 B2 | 7/2009 | Schofield et al. | |
| 7,574,287 B2 | 8/2009 | Lang et al. | |
| 7,777,615 B2 | 8/2010 | Okuda et al. | |
| 7,974,444 B2 | 7/2011 | Hongo | |
| 8,044,776 B2 | 10/2011 | Schofield et al. | |
| 8,072,318 B2 | 12/2011 | Lynam et al. | |

(Continued)

*Primary Examiner* — Michael Lee
(74) *Attorney, Agent, or Firm* — Foley & Lardner LLP

(57) ABSTRACT

A vehicle plug for transmitting power and signals between a vehicle and a trailer includes a power conductor and one or more video signal conductors. The power conductor is configured to provide power to one or more electrical components of the trailer, the one or more electrical components of the trailer includes one or more video cameras. The one or more video signal conductors are configured to receive video signals from the one or more video cameras of the trailer.

20 Claims, 6 Drawing Sheets

(56) References Cited

U.S. PATENT DOCUMENTS

| | | | |
|---|---|---|---|
| 8,170,748 B1 | 5/2012 | Schofield et al. | |
| 9,154,746 B2 * | 10/2015 | Kageta | H04N 7/183 |
| 2002/0003571 A1 | 1/2002 | Schofield et al. | |
| 2003/0133014 A1 | 7/2003 | Mendoza | |
| 2004/0029456 A1 * | 2/2004 | Bure | B60D 1/62 |
| | | | 439/894 |
| 2007/0236364 A1 | 10/2007 | Hubbard et al. | |
| 2009/0174536 A1 * | 7/2009 | Rao | B60T 7/22 |
| | | | 340/436 |
| 2009/0244282 A1 | 10/2009 | Eguiguren | |
| 2010/0039515 A1 | 2/2010 | Dietz | |
| 2011/0096166 A1 | 4/2011 | Englander et al. | |
| 2013/0107045 A1 | 5/2013 | Soderlind et al. | |
| 2013/0229519 A1 | 9/2013 | Kavuru | |
| 2013/0261843 A1 | 10/2013 | Kossira et al. | |
| 2016/0094762 A1 * | 3/2016 | Gebauer | H04N 5/217 |
| | | | 348/148 |

* cited by examiner

REAR CAMERA SYSTEM FOR A VEHICLE WITH A TRAILER

CROSS-REFERENCE TO RELATED APPLICATIONS

This application is a continuation of U.S. patent application Ser. No. 13/554,286, filed Jul. 20, 2012, now U.S. Pat. No. 9,154,746, which is hereby incorporated by reference herein in its entirety.

BACKGROUND

The present specification relates generally to the field of rear camera systems for vehicles. Vehicles, such as automobiles, trucks, SUVs, vans, recreational vehicles, etc., may be equipped with a rear camera system, sometimes known as a backup camera or reversing camera. The rear camera is configured to capture an image of the area behind the vehicle, generally the area towards the ground. The area may include a blind spot hidden from view of the rear view mirror and side view mirrors. The image is transferred to a display, allowing the driver to monitor the area behind the vehicle.

Backup camera systems are especially common on larger vehicles where a large area behind the vehicle may be hidden from the driver. Such larger vehicles are also commonly used to tow trailers, such as utility trailers, enclosed trailers for animals, boat trailers, travel trailers, etc. These trailers obscure the backup camera of the vehicle and introduce a new blind spot that may make backing up the vehicle and trailer hazardous. While some trailers may be equipped with a separate backup camera, these camera systems require a second display. In addition, conventional trailer back up cameras require manual set up.

There is a need for a rear camera system for a vehicle that allows for the improved integration of a trailer rear camera system. Further still, there is a need for a display control system that automatically provides a trailer camera view on an in-vehicle display. Yet further, there is a need for a trailer back up camera system that automatically select the appropriate camera for display. Yet further still, there is a need for a method of selecting video signals for display from multiple sources including a trailer camera.

SUMMARY

One embodiment relates to an apparatus including a video control circuit configured to receive a first video signal from a first camera and a second video signal from a second camera. The video control circuit is configured to provide the first video signal or the second video signal in response to a control signal. The control signal is indicative of whether a trailer plug is connected to a vehicle plug.

Another embodiment relates to a method of using a trailer camera with a vehicle including a reverse camera and a display. The method includes receiving at least one of a first video signals from the reverse camera already on the vehicle and a second video signal from the trailer camera; providing the first video signal to the display when the vehicle is in reverse and the second video signal is not present; and providing the second video signal to the display when the vehicle is in reverse and the second video signal is present.

Yet another embodiment relates to a video circuit for a vehicle being capable of use with a trailer. The vehicle includes a backup camera and the trailer includes a trailer camera. The video circuit includes a first input for receiving a first video signal from the backup camera; a second input for receiving a second video signal from the trailer camera; and a control input for receiving a video signal enable signal on a video signal enable conductor. The video circuit further includes a control circuit for providing the second video signal to the display in response at least in part to the video signal enable signal.

BRIEF DESCRIPTION OF THE DRAWINGS

Features, aspects, and advantages of the present invention will become apparent from the following description, appended claims, and the accompanying exemplary embodiments shown in the drawings, which are briefly described below, wherein like reference numerals denote like elements.

DETAILED DESCRIPTION

Figure 1:
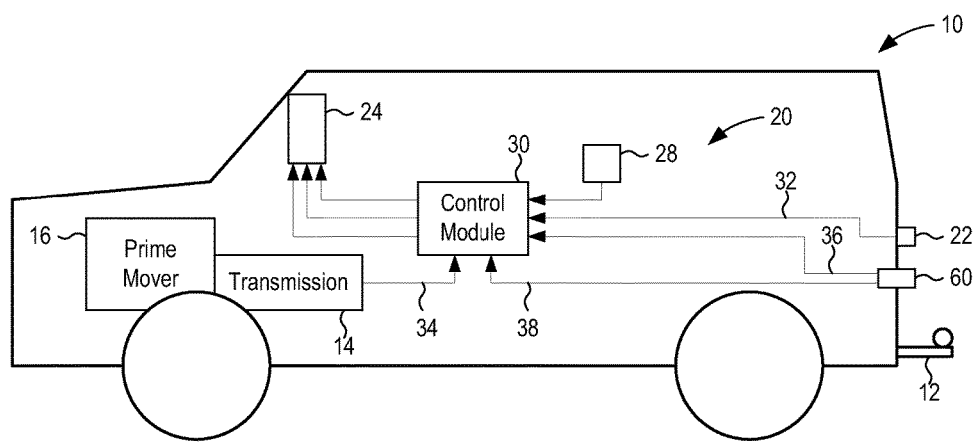
FIG. 1 is a general schematic block diagram of a vehicle including a rear camera system, in accordance with an exemplary embodiment.

Before describing in detail the particular improved system and method, it should be observed that the invention includes a novel structural combination of mechanical and electronic components, but is not limited to any particular detailed configurations thereof. Accordingly, the structure, methods, functions and arrangement of the components have been illustrated in the drawings by readily understandable schematic representations in order not to obscure the disclosure with the structure details which will be readily apparent to one skilled in the art having the benefit of the description herein. Further, the invention is not limited to the particular embodiments depicted in the exemplary drawings, but should be construed in accordance with the language of the claims.

Referring generally to the figures, rear view camera system is configured for operation with a trailer. A control module and/or a display ensures that a view from a trailer camera is provided when the vehicle is in reverse and the trailer is coupled to the vehicle in one embodiment. The display can be an in-vehicle display, such as a dashboard or rear view mirror display. In one embodiment, an enable signal is provided when a trailer connector is attached to the vehicle connector. The enable signal allows the image from the trailer camera to be selected in one embodiment. In one embodiment, the video signal from the camera is used to provide an image on the display when the trailer enable signal is present and the vehicle is in reverse.

Referring to FIG. 1, a vehicle 10 including a rear camera system 20 is shown according to an exemplary embodiment. The vehicle 10 may include a hitch 12 and may be any vehicle capable of towing a trailer, such as an automobile, a truck, a sport utility vehicle (SUV), a crossover vehicle, a van, a recreational vehicle (RV), etc. The vehicle 10 further includes a transmission 14 coupled to a prime mover 16. Prime mover 16 can be an internal combustion engine of any type, an electric motor, etc. Transmission 14 can include a gear selector that includes a reverse mode. The rear camera system 20 monitors the transmission 14 and activates when the transmission 14 into reverse. Rear camera system 20 can receive a reverse signal from transmission 14, a gear selector, or control circuit associated with either the transmission 14 or the gear selector in one embodiment. The vehicle rear camera system 20 includes a camera 22 mounted to the rear of the vehicle 10, a monitor or display 24 viewable by the driver of the vehicle 10, and a control module 30. The display 24 may be an LCD, in-vehicle, in-dashboard display in one embodiment.

The camera 22 is generally centered horizontally and may be in a high mount location such as near a center high mount stop lamp (CHMSL) or may be in a low mount location such as along the rear bumper or near the vehicle license plate (e.g., integrated into the license plate holder). In other embodiments, the camera 22 may be mounted to one side of the vehicle 10, such as near one of the vehicle's tail lights or integrated with the vehicle's tail lights. The camera 22 may be configured to have a relatively wide angle field of view. The camera 22 is generally oriented at a downward angle to better capture a view of the ground behind the vehicle 10 to allow the driver to detect ground-based hazards in the path of the vehicle 10, such as prone or crawling children, toys, rocks, etc. The camera 22 may be rigidly mounted to the vehicle 10 or may be moveable with an actuator. The actuator may be configured to automatically pan or tilt the camera 22 or may be controlled by the driver.

The camera 22 provides a video signal (e.g., an analog video signal) to the display 24 (e.g., monitor, screen, etc.). The display 24 is a device such as an LCD screen that is capable of displaying the image captured by the camera 22. The display 24 is generally provided in view of the driver so that the driver may easily monitor area to the rear of the vehicle 10 while moving in reverse. The display 24 may be integrated into another component of the vehicle 10, such as a rear view mirror, the instrument panel, or the dashboard. In other embodiments, the display 24 may be a separate device that is coupled to the interior of the vehicle windshield or to the vehicle dashboard. In one contemplated embodiment, the display 24 may be an in-dashboard display that is part of the vehicle's navigation system 28.

According to an exemplary embodiment, the display 24 includes multiple video inputs. The video input from the vehicle's rear camera 22 is typically coupled to the first input. If video signals are provided to the display 24, a device such as a switch or multiplexer may be utilized to determine which video signal is shown. In one exemplary embodiment, the device may default to the highest priority input being utilized and may default to a first input if no other inputs are utilized. For example, the display 24 may, by default, show vehicle information such as information related to vehicle navigation (e.g., driving routes) provided by the vehicle navigation system 28 or information related to another vehicle system such as the stereo system. If the transmission 14 is shifted into reverse, the display 24 may be configured to show the image from the rear camera 22 on all or a portion of the display 24 until the transmission 14 is shifted out of reverse. Video signals can be provided in any type of format without departing from the scope of the invention. Video signals can be analog or digital video signals. Camera 22, display 24 and navigation system 28 can be OEM equipment on vehicle 12.

In other embodiments, the display 24 may not be coupled to another system such as the vehicle navigation system 28. Instead, when not showing the image transmitted by the rear camera 22 (e.g., when the vehicle 10 is not in reverse), the display 24 may simply show a blank screen or be in an off state.

Figure 2:
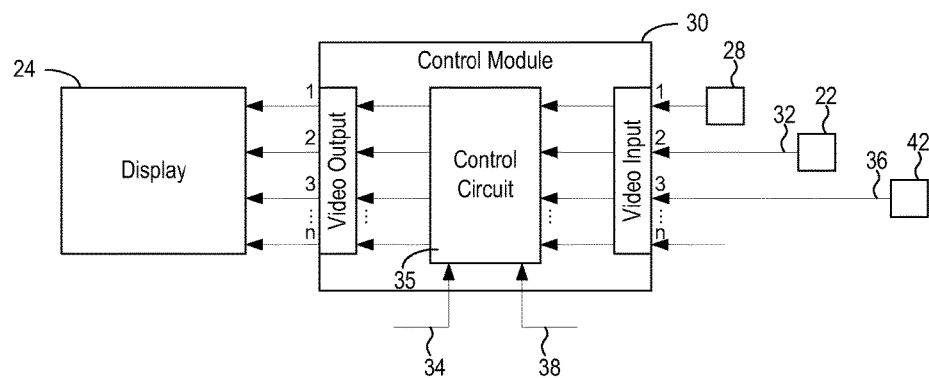
FIG. 2 is a general schematic block diagram of the control module for the vehicle of FIG. 1, in accordance with an exemplary embodiment.

Referring now to FIG. 2, the control module 30 is provided between the source of the video signal (e.g., the camera 22) and the display 24 and receives data or signals to determine which of multiple video signals should be shown on the display 24. The control module 30 includes multiple video inputs (1 to n). According to one exemplary embodiment, a first video input may receive a video signal from a vehicle system such as the navigation system 28, the stereo system, etc. A second video input may receive the video signal from the rear camera 22 coupled to the rear of the vehicle 10 via a first video circuit 32. The control module 30 further includes additional video inputs that may receive video signals from other sources, such as a second video input that receives a second video signal via a second video circuit 36. The control module 30 can be provided as OEM equipment.

Figure 3:
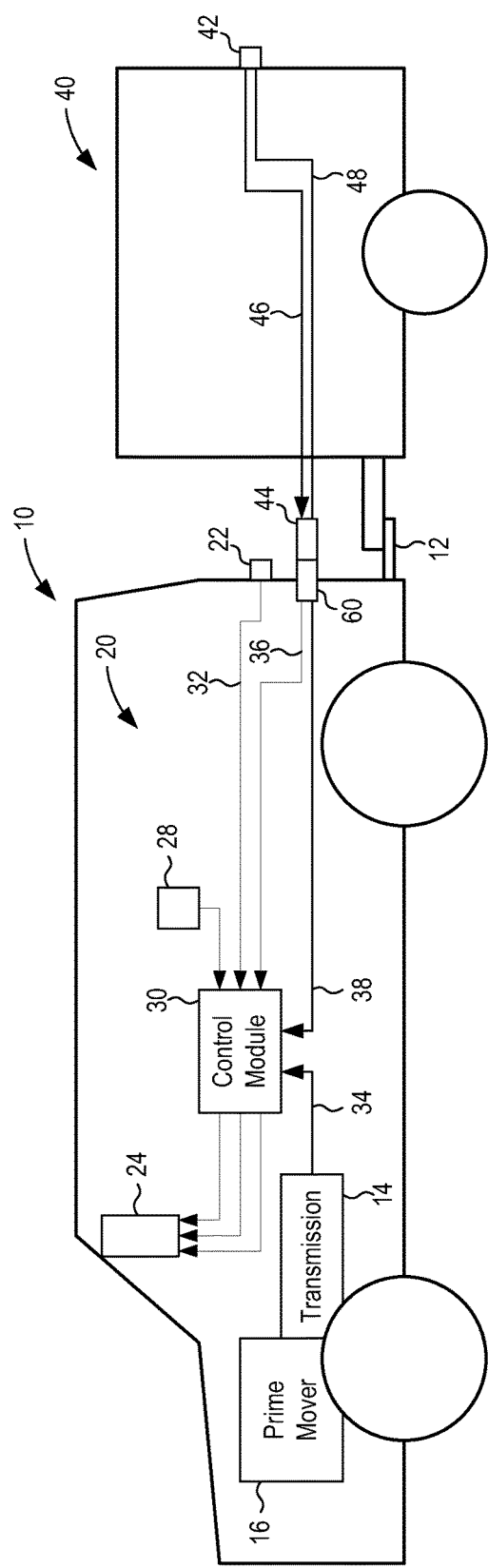
FIG. 3 is a general schematic block diagram of the vehicle of FIG. 1 coupled to a trailer including a rear camera system, in accordance with an exemplary embodiment.

The second video circuit 36 may transmit video data from, for example, a rear camera 42 mounted to a trailer 40 as illustrated in FIG. 3. The camera 42 may be similar to the rear camera 22 on the vehicle 10 and may be configured to have a relatively wide angle field of view. The camera 42 may be mounted anywhere on the trailer 40 and may be integrated into another component of the trailer such as a bumper, a lamp assembly (e.g., a tail light), or a trim piece. The camera 42 may be generally oriented at a downward angle to better capture a view of the ground behind the trailer 40 to allow the driver to detect ground-based hazards in the path of the trailer 40. The camera 42 outputs a video signal (e.g., an analog video signal) to a third video circuit 46 and is powered by a power circuit 48. The third video circuit 46 and the power circuit 48 are couple to the second video circuit 36 and the electrical system of the vehicle 10, respectively, through the interconnection of a trailer plug 44 and a vehicle plug 60, described in more detail below.

Referring back to FIG. 2, the control module 26 selectively transmits a video signal (e.g., a signal from the navigation system 28, the vehicle rear camera 22, the trailer rear camera 42, etc.) from a video output to the display 24 as determined by a control circuit 35. The control module 30 receives control parameters for the control circuit 35 from a transmission input and a video enable signal (VES) input. The transmission input receives a signal indicating when the vehicle 10 is in reverse via a transmission circuit 34 (e.g., a reverse signal). The transmission circuit 34, for example, may be coupled to the transmission control module for an automatic transmission 14. The VES input receives signals indicating when the trailer wiring harness plug 44 is coupled to the vehicle plug 60 via a VES circuit 38. The VES circuit 38 is coupled to the vehicle plug 60. The VES circuit may detect the connection between the plug 44 and the plug 60 by monitoring the power line in the wiring harness and detecting when power is being output to the trailer 40. The transmission circuit 34 can be any device or circuit for providing an indication that vehicle 10 is in reverse without departing from the scope of the invention. The VES circuit 38 can be any device for determining whether plugs 44 and 60 are connected or otherwise for determining whether camera 42 is providing an image.

Figure 4:
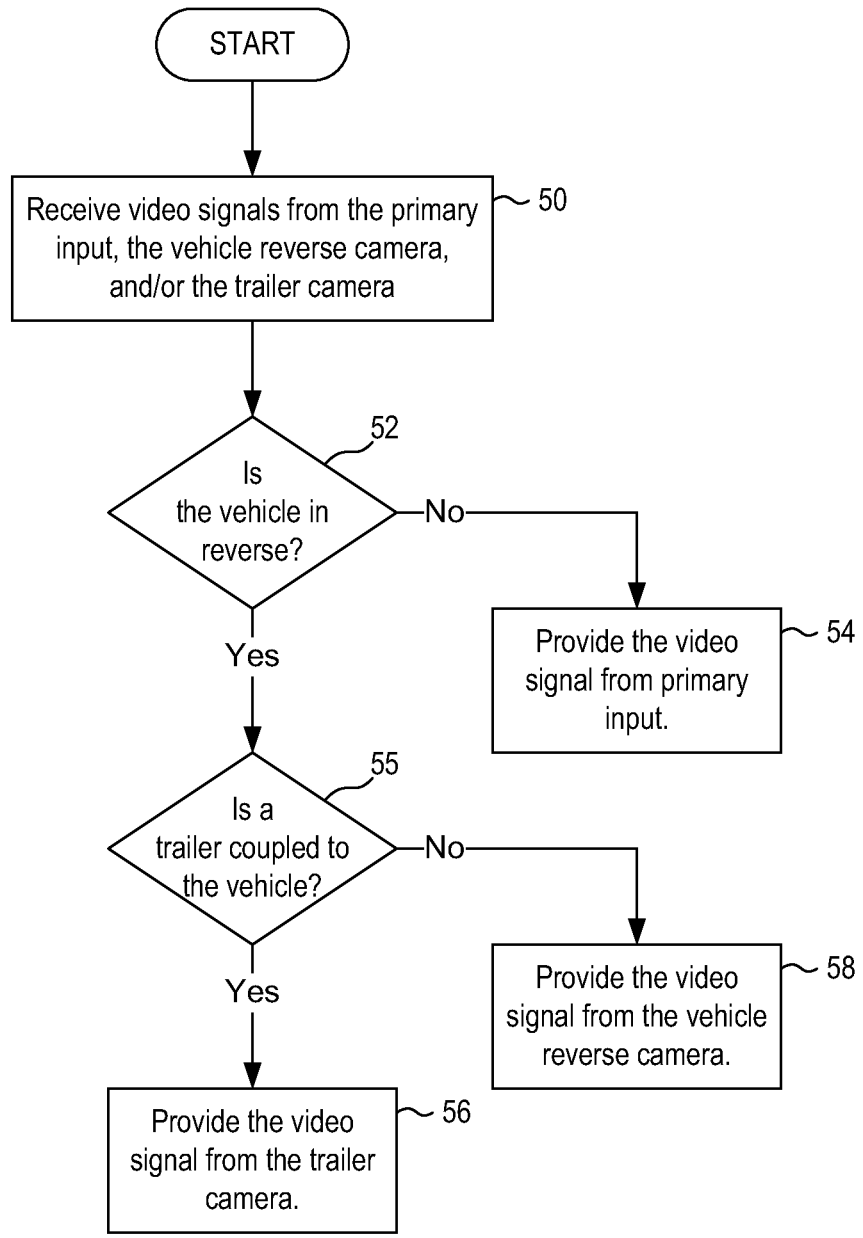
FIG. 4 is a flowchart of a method for choosing and providing a video signal to a display, in accordance with an exemplary embodiment.

Referring now to FIG. 4, a flowchart schematically describing the operation of the control module 30 is shown according to an exemplary embodiment. Although shown as a flow chart, the method can also be represented as a state diagram in which states defining the video signal associated with the image on display 24 are selected by the reverse signal and the VES (e.g., trailer camera enable signal). The control module 30 first receives at least one video signal from at least one of a variety of sources, such as a primary source (e.g., the vehicle navigation system 28); a first video source, such as the vehicle reverse camera 22; and a second video source, such as the trailer camera 42 (step 50) in one embodiment. The control circuit 35 then receives a reverse signal from the transmission circuit 34 to determine if the vehicle 10 is in reverse (step 52). If the vehicle 10 is not in reverse, the control module 30 provides the video signal from the primary video source to the display 24 (step 54). When the vehicle 10 is in reverse, the control circuit 35 via the VES circuit 38 determines if the trailer 40 is coupled to the vehicle 10 and a signal from the trailer camera 42 is present (step 55). If the trailer 40 is coupled to the vehicle 10, the control module 30 provides the video signal from the trailer camera 42 to the display 24 (step 56). If the trailer 40 is not coupled to the vehicle 10, the control module 30 provides the video signal from the vehicle reverse camera 22 to the display 24 (step 58). While only two camera video inputs are described, in other embodiments, the control circuit 35 and the control module 30 may be configured to receive additional video inputs and additional control inputs and provide the video inputs to the display 24 based on the control inputs.

In some embodiments, the display 24 may be capable of receiving and showing multiple video signals simultaneously, such as in a split-screen or picture-in-picture arrangement. For example: the control module may provide both a video signal from the primary source and the video signal from a camera and the display may show the video signal from the primary source with the video signal from the camera shown in a window or inset.

Figure 5A:
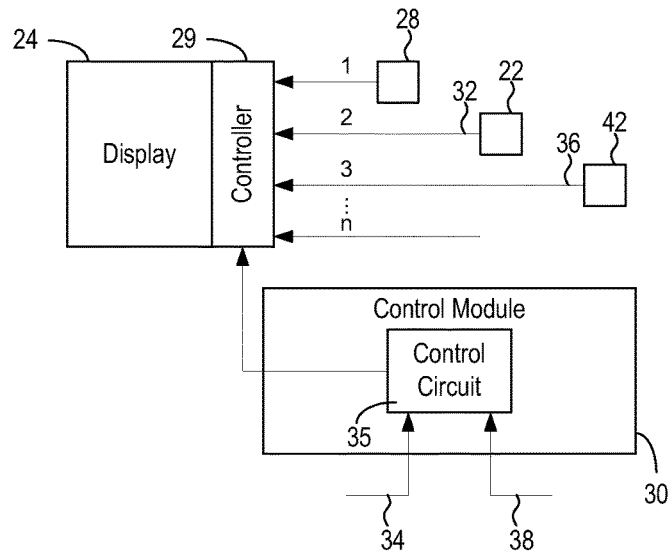
FIG. 5A is a schematic block diagram of a control module for the vehicle of FIG. 1, in accordance with another exemplary embodiment.

Referring to FIG. 5A, in another embodiment, the control module 30 may not interfere with the transmission of video signals from the various sources. Instead, the video signals may all pass through the control module 30 to the display 24 or bypass the control module 30 and the control module 30 may provide instructions from the control circuit 35 to a display controller 29 for selectors which video signal(s) are to be shown on the display 24.

Figure 5B:
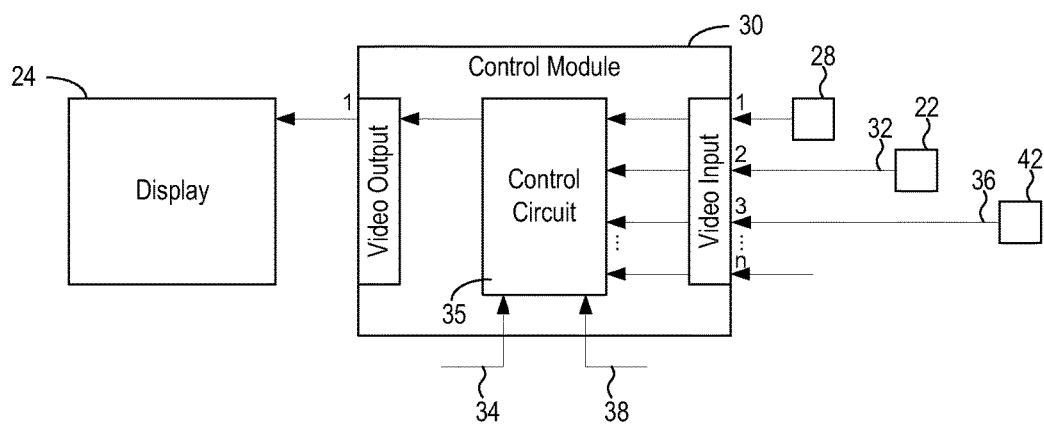
FIG. 5B is a schematic block diagram of a control module for the vehicle of FIG. 1, in accordance with another exemplary embodiment.

Referring to FIG. 5B, in another embodiment, the control module 30 may have a single output for transmitting video signals from the control module 30 to the display 24. The control circuit 35 may then act as a multiplexer to provide only one of multiple video inputs to the display 24. Alternatively, the video signal associated with a reverse camera 22 can be chosen by display 24 or control module 30 when vehicle 10 is in reverse and the video signal from trailer camera 42 is not present. When the video signal from camera 42 is present and vehicle 10 is in reverse, the video signal from camera 42 is chosen.

Figure 6:
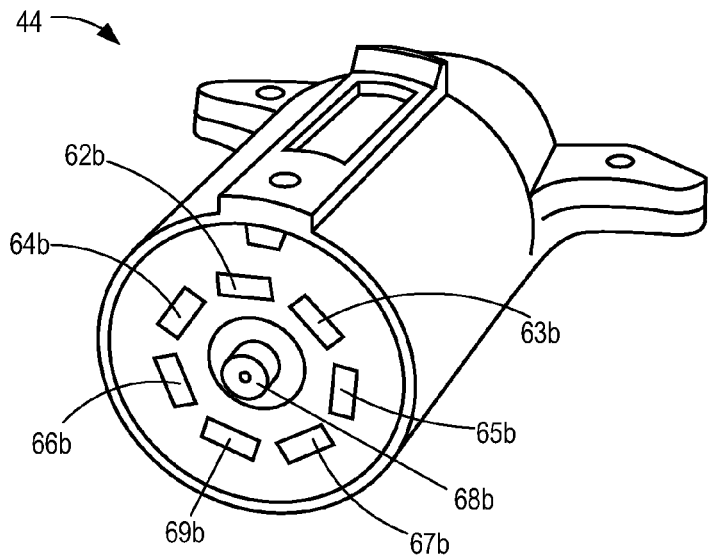
FIG. 6 is a schematic isometric view of a trailer-side 8-pin plug, in accordance with an exemplary embodiment.
Figure 7:
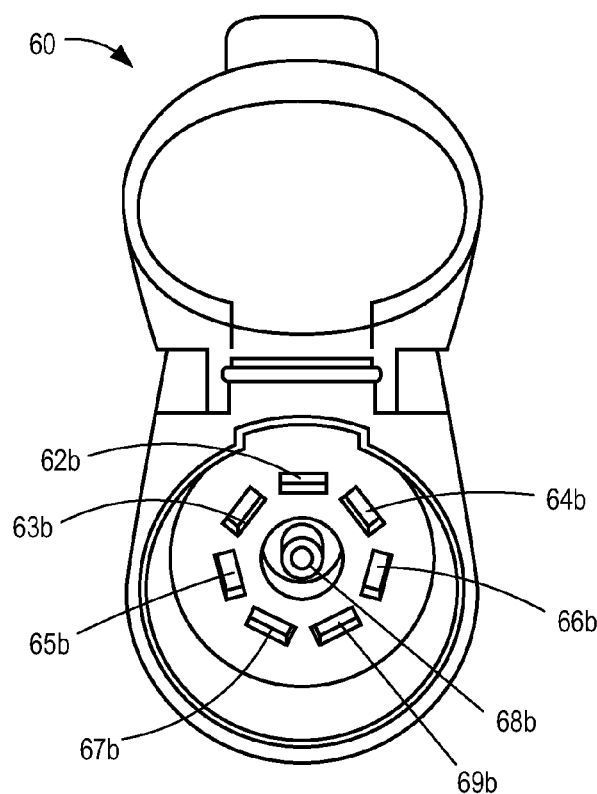
FIG. 7 is a schematic isometric view of a vehicle-side 8-pin plug, in accordance with an exemplary embodiment.
Figure 8B:
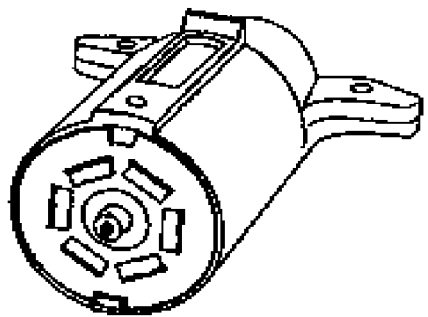
FIG. 8B is a schematic isometric view of a prior art trailer-side 7-pin plug.
Figure 8A:
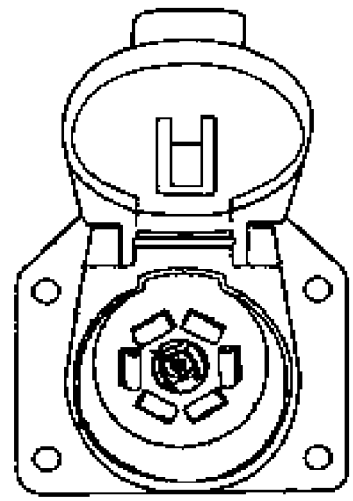
FIG. 8A is a schematic isometric view of a prior art vehicle-side 7-pin plug.

Referring now to FIGS. 6 and 7, plugs 44 and 60 including a conductor for the video line from the trailer camera 42 are shown schematically. The trailer plug 44 (FIG. 6) and the vehicle plug 60 (FIG. 7) are similar in configuration to conventional 7-pin trailer connectors, shown in FIGS. 8A and 8B and include a multitude of mating conductors 62-68 configured to transmit power and signals between the vehicle 10 and the trailer 40. According to an exemplary embodiment, the plug 44 and the plug 60 each include a power conductor 62. The power conductor 62 may be coupled to the vehicle electrical system (e.g., a 12V DC system). The power circuit 48 is coupled to the power conductor 62 to provide power to the trailer camera 42. The plug 44 and the plug 60 further include a tail light conductor 63, a right turn signal conductor 64, a left turn signal conductor 65, a brake signal conductor 66, a ground conductor 67, and a auxiliary conductor 68. The plug 44 and the plug 60 still further include a video signal conductor 69. The video signal conductors 69 allow the image captured by the trailer camera 42 to be transmitted to the control module 30 by coupling the third video circuit 46 to the second video circuit 36. The arrangement of the conductors 62-69 for the plugs 44 and 60 are exemplary only and a variety of alternate configurations are possible. The conductors 62-69 may be assigned to various systems depending on the needs and configurations of the vehicle 10 and the trailer 40. In some exemplary embodiments, the various conductors 62-69 may be color-coded.

Figure 9A:
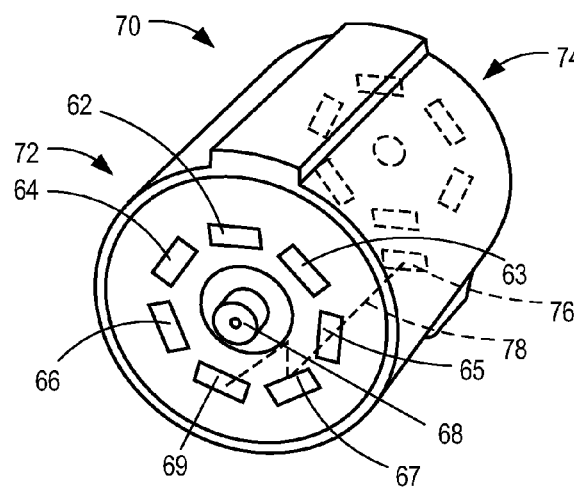
FIG. 9A is a schematic isometric view of a trailer-side 8-pin plug, in accordance with an exemplary embodiment.
Figure 9B:
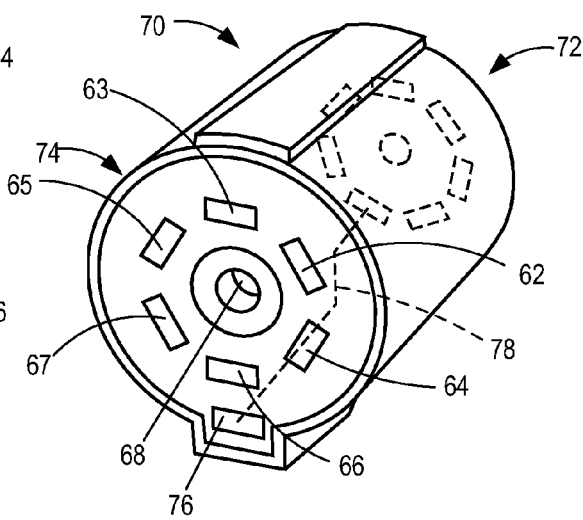
FIG. 9B is a schematic rear isometric view of the trailer-side 8-pin plug illustrated in FIG. 9A, in accordance with an exemplary embodiment.

Referring now to FIGS. 9A and 9B, an adapter 70 is shown according to an exemplary embodiment. The adapter 70 is configured to allow a plug such as a 7-pin plug to be utilized with an 8-pin plug including a video conductor, as described above. Such an adapter 70 may be utilized, for example, to retrofit a trailer with a 7-pin plug to have rear camera capabilities and be coupled to a vehicle with an 8-pin plug and a camera system 20 including a control module 30. In other embodiments, a similar adapter may be utilized to retrofit a vehicle with a 7-pin plug to be able to be coupled to a trailer having an 8-pin capabilities and a rear camera system.

As shown in FIGS. 9A and 9B, the adapter 70 includes a first side 72 with an 8-pin configuration and a second side 74 with a 7-pin configuration. Conductive paths couple the conductors 62-68 on either side of the adapter 70. An additional socket 76 is provided on the second side 74 to allow a video circuit to be coupled to the adapter 70. A conductive path 78 connects the socket 76 to the video signal conductor 69 on the first side 72.

The construction and arrangement of the elements of the rear camera system as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the elements and/or assemblies of the enclosure may be constructed from any of a wide variety of materials that provide sufficient strength or durability, in any of a wide variety of colors, textures, and combinations.

What is claimed is:

1. An apparatus, comprising:
   a vehicle plug; and
   a video control circuit configured to receive a first video signal from a first camera and a second video signal from a second camera, wherein the video control circuit is configured to provide the first video signal or the second video signal in response to a control signal, wherein the control signal is indicative of whether a trailer plug is connected to the vehicle plug, wherein the video control circuit comprises a sense circuit configured to generate the control signal, the sense circuit being configured to determine the trailer plug is connected by monitoring power provided to or by the second camera; and
   wherein the vehicle plug is attached to the rear of a vehicle for transmitting power and signals between the vehicle and a trailer, the vehicle plug comprising:
      a first end configured to connect to the trailer plug, comprising a power conductor;
      one or more video signal conductors configured to receive the second video signal; and
      a second end configured to connect to the vehicle, comprising a first conductor configured to transmit the second video signal to the video control circuit disposed in the vehicle, wherein the video control circuit is configured to determine that the vehicle is in reverse and the trailer plug is coupled to the first end, wherein the second video signal is provided to a display when the vehicle is in reverse and the trailer plug is coupled to the first end.

2. The apparatus of claim 1, wherein the vehicle plug further comprises an adapter configured to utilize a plug with a video conductor.

3. The apparatus of claim 2, wherein the adapter is configured to connect the vehicle plug with the trailer plug.

4. The apparatus of claim 1, wherein the vehicle plug further comprises a light conductor, a brake signal conductor, a ground conductor, a right turn conductor, a left turn conductor and an auxiliary conductor.

5. The apparatus of claim 1, wherein the one or more video signal conductors is configured to allow an image captured by the second camera disposed on the trailer to be transmitted to the vehicle.

6. The apparatus of claim 1, wherein the vehicle plug further comprises a video enable signal (VES) circuit configured to detect connection between the vehicle plug and the trailer plug.

7. The apparatus of claim 6, wherein the VES circuit is configured to detect a video signal from the second camera.

8. A system comprising:
   a trailer plug;
   a video control module for a vehicle, the vehicle being capable of use with a trailer, the vehicle having a backup camera and a display and the trailer having a trailer camera, the video control module comprising a first input for receiving a first video signal from the backup camera, a second input for receiving a second video signal from the trailer camera, and a control input for receiving a video signal enable signal on a video signal enable conductor, and a control circuit for providing the second video signal to the display in response at least in part to the video signal enable signal, wherein the video signal enable signal is provided by a sense circuit configured to sense power usage by the trailer camera through the trailer plug; and
   wherein the trailer plug is attached to a trailer for transmitting power and signals between the vehicle and the trailer, the trailer plug comprising:
      a power conductor configured to receive power from the vehicle, wherein the received power is used at least in part for the trailer camera; and
      one or more video signal conductors configured to transmit the second video signal from the trailer to the vehicle.

9. The system of claim 8, further comprising an adapter configured to utilize a plug with a video conductor.

10. The system of claim 9, wherein the adapter is configured to connect the trailer plug with a vehicle plug.

11. The system of claim 8, further comprising a light conductor, a brake signal conductor, a ground conductor, a right turn conductor, a left turn conductor and an auxiliary conductor.

12. The system of claim 10, wherein the adapter is configured to connect the trailer plug with a vehicle plug.

13. A method of using a trailer camera with a vehicle comprising a reverse camera and a display and transmitting power and signals between the vehicle and a trailer, the method comprising:
   creating an electrical connection between the vehicle and the trailer via a vehicle plug attached to a rear portion of the vehicle and a trailer plug attached to the trailer;
   providing power to one or more electrical components of the trailer through the electrical connection, wherein the one or more electrical components comprise one or more video cameras, the one or video cameras comprising the trailer camera;
   receiving at least one of a first video signal from the reverse camera and a second video signal from the trailer camera;
   providing the first video signal to the display when the vehicle is in reverse and a sense signal is not present determining whether the vehicle is in reverse; and
   providing the second video signal to the display when the vehicle is in reverse and the sense signal is present, wherein the sense signal is provided by a sense circuit configured to monitor power associated with the trailer camera through the trailer plug associated with the trailer camera via the electrical connection.

14. The method of claim 13, wherein the electrical connection between the vehicle plug and the trailer plug is connected external to the vehicle.

15. The method of claim 14, wherein creating the electrical connection comprises using an adapter configured to utilize at least one of the vehicle plug or the trailer plug with a video conductor.

16. The method of claim 14, wherein the vehicle plug and the trailer plug comprise a plurality of conductors, the plurality of conductors comprising a power conductor, one or more video signal conductors, a light conductor, a brake signal conductor, a ground conductor, a right turn conductor, a left turn conductor and an auxiliary conductor.

17. The method of claim 16, wherein the one or more video signal conductors configured to allow an image captured by the trailer camera disposed on the trailer to be transmitted to the vehicle.

18. The method of claim 13, wherein determining whether the vehicle is reverse comprises determining whether a transmission of the vehicle is in reverse.

19. The method of claim 13, further comprising detecting video signals from the one or more video cameras of the trailer.

20. The method of claim 13, wherein the electrical connection between the vehicle and the trailer are configured to transmit a plurality of signals from the trailer to the vehicle, the plurality of signals comprising: turning signals, light signals, brake signals, video signals and audio signals.

* * * * *